United States Patent
Sumii et al.

(10) Patent No.: US 9,520,770 B2
(45) Date of Patent: Dec. 13, 2016

(54) SOFT START CIRCUIT

(71) Applicant: Rohm Co., Ltd., Kyoto (JP)

(72) Inventors: Ryosuke Sumii, Kyoto (JP); Kiminobu Sato, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/827,554

(22) Filed: Aug. 17, 2015

(65) Prior Publication Data
US 2016/0049866 A1 Feb. 18, 2016

(30) Foreign Application Priority Data
Aug. 18, 2014 (JP) .................................. 2014-165855

(51) Int. Cl.
*H02M 1/36* (2007.01)
*H02M 3/156* (2006.01)

(52) U.S. Cl.
CPC .............. *H02M 1/36* (2013.01); *H02M 3/156* (2013.01)

(58) Field of Classification Search
CPC ............ H02M 1/00; H02M 1/32; H02M 1/36
See application file for complete search history.

(56) References Cited

U.S. PATENT DOCUMENTS

| | | | | |
|---|---|---|---|---|
| 6,091,234 A * | 7/2000 | Kitagawa | ............ | H02M 3/1588 323/244 |
| 6,430,070 B1 * | 8/2002 | Shi | .......................... | H02M 1/36 323/271 |
| 6,465,993 B1 * | 10/2002 | Clarkin | ................. | H02M 3/156 323/272 |
| 6,965,223 B1 * | 11/2005 | MacLean | ................ | H02M 1/36 323/276 |
| 7,106,036 B1 * | 9/2006 | Collins | ................... | H02M 1/36 323/282 |
| 7,362,595 B2 * | 4/2008 | Noma | ................. | H02M 3/1588 323/224 |
| 7,541,795 B1 * | 6/2009 | Smith | ..................... | H02M 1/32 323/283 |
| 7,782,024 B2 * | 8/2010 | Fukushi | ............... | H02M 1/088 323/222 |
| 9,218,012 B2 * | 12/2015 | Takagimoto | ............ | G05F 1/468 |
| 2003/0020442 A1 * | 1/2003 | Hwang | ............... | H02M 1/0845 323/288 |
| 2005/0024033 A1 * | 2/2005 | Nakata | .................... | H02M 1/36 323/282 |
| 2005/0116692 A1 * | 6/2005 | Sugiyama | ............ | H02M 3/156 323/222 |
| 2008/0049465 A1 * | 2/2008 | Parto | ........................ | H02M 1/36 363/49 |
| 2008/0136341 A1 * | 6/2008 | Araki | ................ | H02M 3/33507 315/209 R |
| 2008/0197821 A1 * | 8/2008 | Hasegawa | ............ | H02M 3/156 323/238 |

(Continued)

FOREIGN PATENT DOCUMENTS

JP 2005-51956 2/2005

Primary Examiner — Timothy J Dole
Assistant Examiner — Yusef Ahmed
(74) Attorney, Agent, or Firm — Fish & Richardson P.C.

(57) ABSTRACT

A soft start circuit accepts an input of a reference voltage set arbitrarily, and generates a soft start voltage that takes a predetermined sweep time to slowly rise from a predetermined lowest value to a highest value that is higher than the reference voltage and changes in accordance with the reference voltage.

8 Claims, 9 Drawing Sheets

(56) References Cited

U.S. PATENT DOCUMENTS

| | | | | |
|---|---|---|---|---|
| 2008/0238394 A1* | 10/2008 | Hasegawa | ............... | H02M 1/36 323/283 |
| 2008/0238395 A1* | 10/2008 | Hasegawa | ............... | H02M 1/36 323/283 |
| 2008/0259659 A1* | 10/2008 | Choi | ................ | H02M 1/32 363/50 |
| 2008/0278129 A1* | 11/2008 | Shimizu | ................ | H02M 1/32 323/282 |
| 2009/0146633 A1* | 6/2009 | Karasawa | ............... | H02M 1/36 323/290 |
| 2009/0278521 A1* | 11/2009 | Omi | ................ | H02M 1/36 323/288 |
| 2010/0127678 A1* | 5/2010 | Inatomi | ................ | H02M 1/32 323/282 |
| 2011/0102026 A1* | 5/2011 | Takahashi | ............... | H03K 5/06 327/130 |
| 2011/0109294 A1* | 5/2011 | Larson | ................ | H02M 1/36 323/285 |
| 2011/0141098 A1* | 6/2011 | Yaguma | ............... | G09G 3/3688 345/212 |
| 2011/0279045 A1* | 11/2011 | Uchimoto | ............... | H02M 1/36 315/186 |
| 2012/0049829 A1* | 3/2012 | Murakami | ............... | H02M 1/32 323/288 |
| 2012/0091978 A1* | 4/2012 | Ishii | ................ | H02M 1/36 323/271 |
| 2012/0153921 A1* | 6/2012 | Brokaw | ............... | H02M 3/156 323/288 |
| 2013/0241507 A1* | 9/2013 | Hara | ................ | G05F 1/10 323/282 |
| 2013/0307435 A1* | 11/2013 | Takagimoto | ............ | G05F 1/468 315/224 |
| 2013/0308061 A1* | 11/2013 | Murakami | ........... | H02M 3/1582 348/730 |
| 2014/0032942 A1* | 1/2014 | Takehara | ............... | H02M 3/156 713/300 |
| 2014/0168567 A1* | 6/2014 | Kikuchi | ............... | H05B 33/0815 349/61 |
| 2014/0217999 A1* | 8/2014 | Wibben | ................ | H02M 1/36 323/282 |
| 2014/0253072 A1* | 9/2014 | Hussien | ................ | H02M 1/36 323/281 |
| 2014/0313608 A1* | 10/2014 | Nakabayashi | ...... | H02M 3/1584 360/39 |
| 2015/0079914 A1* | 3/2015 | Takahashi | ............ | H01Q 1/3241 455/127.2 |
| 2015/0194888 A1* | 7/2015 | Kasai | ................... | H02M 3/158 323/271 |

* cited by examiner

SOFT START CIRCUIT

CROSS-REFERENCE TO RELATED APPLICATIONS

This application is based on the following Japanese Patent Application, the contents of which are hereby incorporated by reference:

(1) Patent Application No.: 2014-165855 (the filing date: Aug. 18, 2014)

BACKGROUND OF THE INVENTION

1. Field of the Invention

The present invention relates to a soft start circuit.

2. Description of Related Art

Conventionally, many of power source apparatuses that generate an output voltage from an input voltage have a soft start circuit, as a device for curbing a rush current at a startup time, which takes a predetermined soft start time to raise slowly the output voltage.

In the meantime, as an example of the prior art relevant to the above description, there is JP-A-2005-51956.

However, in the conventional soft start circuit, there is a problem that if it is attempted to keep the soft start time constant irrespective of a set target value of the output voltage, a circuit scale becomes large unnecessarily.

SUMMARY OF THE INVENTION

In light of the above problem found by the inventors of the present application, it is an object of the invention disclosed in the present specification to provide a soft start circuit that is able to keep a soft start time constant while curbing increase in circuit scale, an power source apparatus and an electronic apparatus that include the soft start circuit.

The soft start circuit disclosed in the present specification is structured to accept an input of a reference voltage set arbitrarily and generate a soft start voltage that takes a predetermined sweep time to slowly rise from a predetermined lowest value to a highest value that is higher than the reference voltage and changes in accordance with the reference voltage.

Other features, elements, steps, advantages, and characteristics of the present invention will become more apparent from the following detailed description of the best embodiments and the attached drawings.

DETAILED DESCRIPTION OF PREFERRED EMBODIMENTS

First Embodiment

Figure 1:
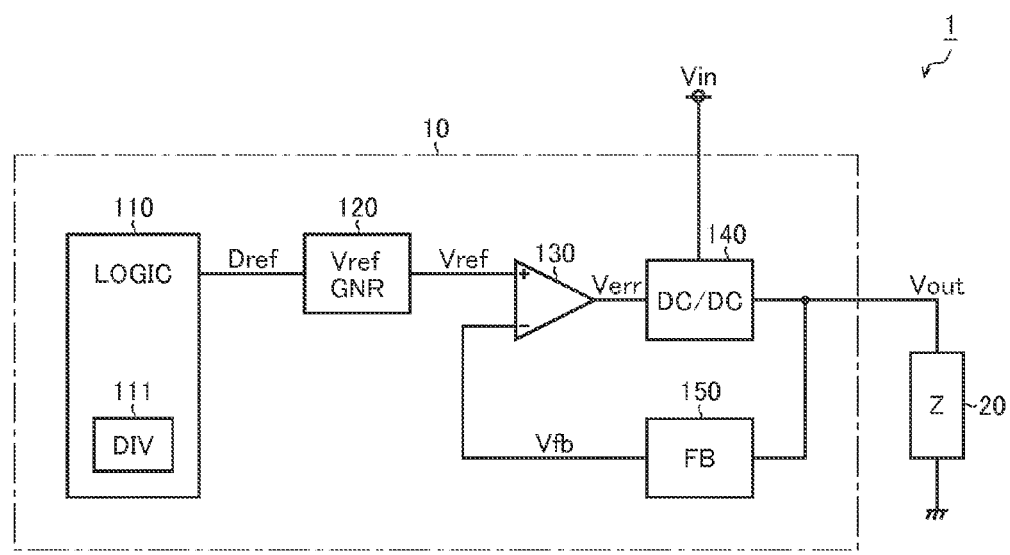
FIG. 1 is a view showing a whole structure (first embodiment of a power source apparatus 10) of an electronic apparatus 1.

FIG. 1 is a view showing a whole structure (first embodiment of the power source apparatus 10) of the electronic apparatus 1. The electronic apparatus 1 according to the present structural example has the power source apparatus 10 that generates an output voltage Vout from an input voltage Vin, and a load 20 that is supplied with the output voltage Vout from the power source apparatus 10 to operate.

The power source apparatus 10 includes a logic circuit 110, a reference voltage generation circuit 120, an error amplifier 130, a DC/DC converter 140, and a feedback voltage generation circuit 150.

The logic circuit 110 increases an m-bit digital reference signal Dref from the minimum value (=00h (0d)) to the last value in increments of one in such a manner that the output voltage Vout rises slowly when the power source apparatus 10 is started up.

In the meantime, the logic circuit 110 sets the last value of the digital reference signal Dref in accordance with a target value of the output voltage Vout. Describing specifically, the logic circuit 110 sets the last value of the digital reference signal Dref at a larger value as the target value of the output voltage Vout becomes higher; in contrast, the logic circuit 110 sets the last value of the digital reference signal Dref at a smaller value as the target value of the output voltage Vout becomes lower.

For example, a case is considered where variable control of the output voltage Vout is performed in a range of 0 V to 20 V by using the digital reference signal Dref (=00h to FFh (0d to 255d)) composed of 8-bits (256 gradations). In this case, when Dref=7 Fh (127d), Vout=10 V, and when Dref=3 Fh (63d), Vout=5 V. In the meantime, the target value of the output voltage Vout can be set arbitrarily by rewriting a register value of the logic circuit 110 from outside the power source apparatus 10 and the like.

Besides, the logic circuit 110 has a function to always keep a soft start time Tss (which corresponds to a time required for the digital reference Dref to reach the last value) constant by variably setting an increment period T of the digital reference signal Dref in accordance with the target value (namely, in accordance with the last value of the digital reference signal Dref) of the output voltage Vout. In the meantime, the logic circuit 110 incorporates a division portion 111, as a device for achieving the above function, which calculates the increment period T by dividing the desired soft start time Tss by the last value of the digital reference signal Dref. This point is detailed later.

The reference voltage generation circuit 120 applies a digital/analog conversion process and an amplification process to the m-bit digital reference signal Dref to generate a $2^m$-gradation reference voltage Vref. The larger a data value of the digital reference signal Dref is, the higher the reference voltage Vref becomes, while the smaller the data value of the digital reference signal Dref is, the lower the reference voltage Vref becomes.

The error amplifier 130 generates an error voltage Verr in accordance with a difference between the reference voltage Vref input into a non-inverting input terminal (+) and a feedback voltage Vfb input into an inverting input terminal (−). The error voltage Verr rises when the feedback voltage Vfb is lower than the reference voltage Vref, and drops when the feedback voltage Vfb is higher than the reference voltage Vref.

The DC/DC converter 140 generates the output voltage Vout from the input voltage Vin in such a manner that the error voltage Verr becomes small. In the meantime, as to the output type of the DC/DC converter 140, any one of a step-up type, a step-down type, and a step-up/down type may be used.

The feedback voltage generation circuit 150 generates the feedback voltage Vfb in accordance with the output voltage Vout. For example, as the feedback voltage generation circuit 150, it is possible to use a resistance division circuit that divides the output voltage Vout.

Figure 2:
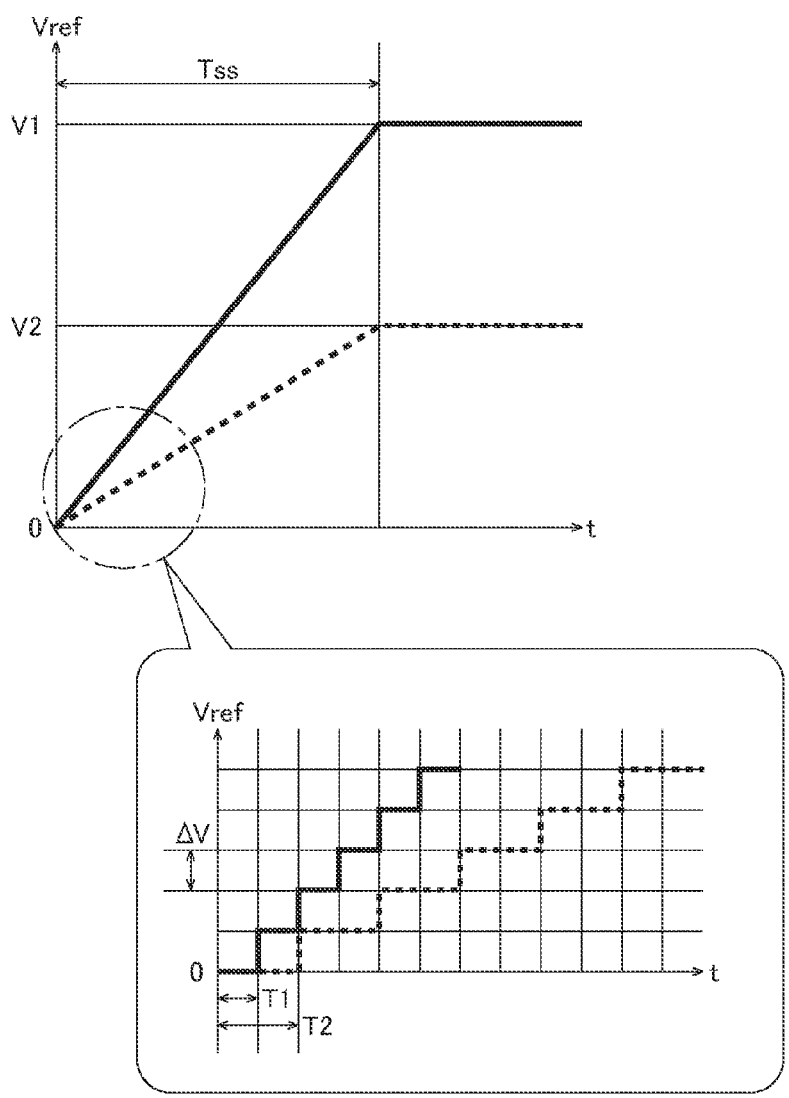
FIG. 2 is a view for describing variable control of an increment period T.

FIG. 2 is a view for describing variable control of the increment period T performed by the logic circuit 110. As described above, the logic circuit 10 incorporates the division portion 111 which calculates the increment period T by dividing the desired soft start time Tss by the last value of the digital reference signal Dref, and variably sets the increment period T of the digital reference signal Dref in accordance with the target value (namely, in accordance with the last value of the digital reference signal Dref) of the output voltage Vout.

As indicated by a solid line in the figure, in a case where the reference voltage Vref is swept from 0 V to V1, the increment period T of the digital reference signal Dref is set at "T1." Accordingly, the reference voltage Vref rises in a stepwise manner by an increment voltage ΔV at every increment period T and finally takes the soft start time Tss to reach V1.

On the other hand, as indicated by a broken line in the figure, in a case where the reference voltage Vref is swept from 0 V to V2 (=half V1), the increment period T of the digital reference signal Dref is set at "T2 (=two times T1)." In other words, the target value of the reference voltage Vref is pulled down from V1 to V2, in accordance with which a rising speed of the reference voltage Vref is dropped.

Because of such variable control of the increment period T, it becomes possible to always keep the soft start time Tss constant irrespective of the reference voltage Vref.

However, the power source apparatus 10 according to the first embodiment needs the division portion 111 (and its control circuit) that has a relatively large circuit scale. Accordingly, to achieve reduction in chip size, it can be said that there is room for further improvement.

Second Embodiment

Figure 3:
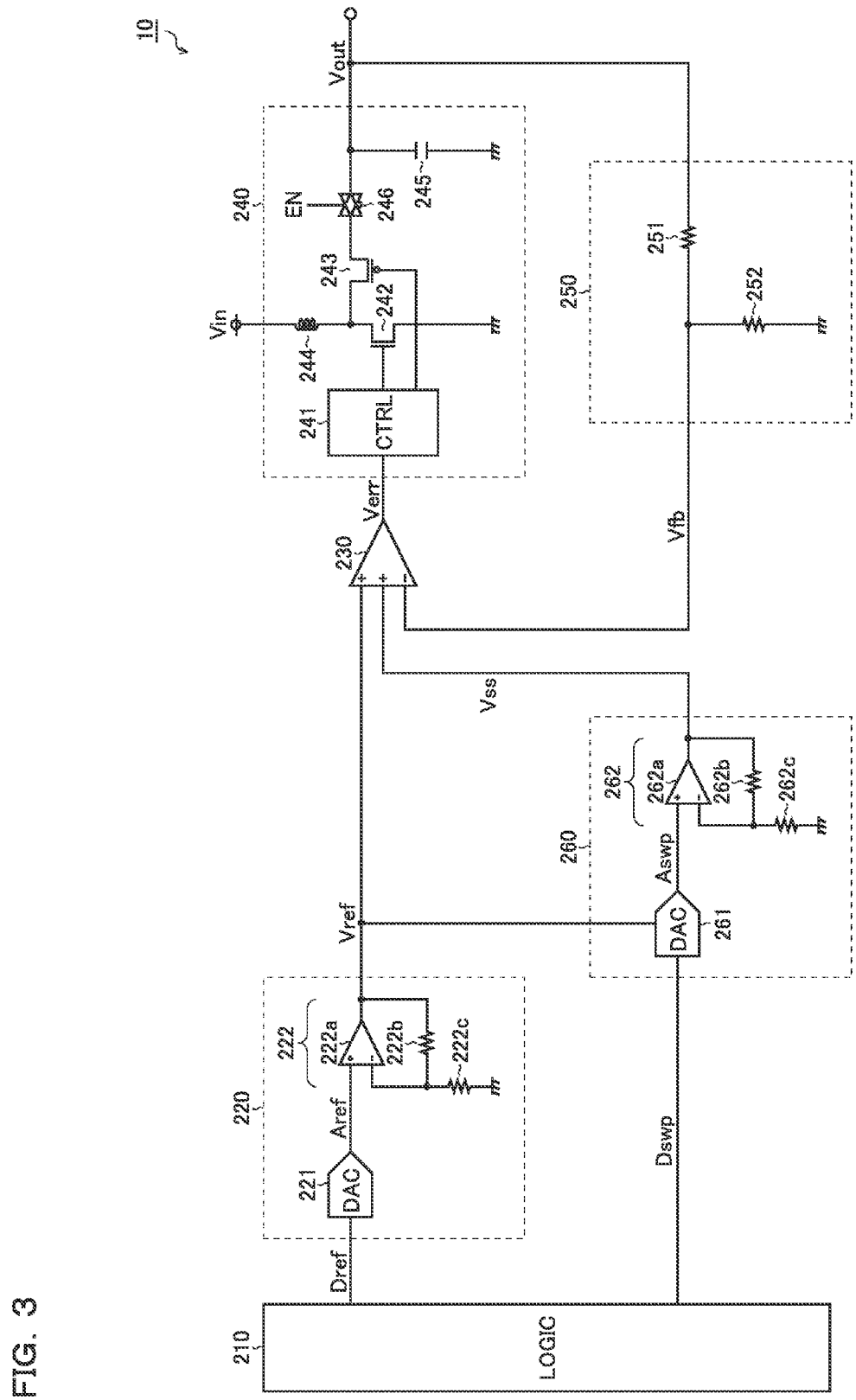
FIG. 3 is a view showing a second embodiment of the power source apparatus 10.

FIG. 3 is a view showing a second embodiment of the power source apparatus 10. The power source apparatus 10 according to the present embodiment is a step-up type switching power source apparatus that generates the desired output voltage Vout by stepping up the input voltage Vin, and includes a logic circuit 210, a reference voltage generation circuit 220, an error amplifier 230, a DC/DC converter 240, a feedback voltage generation circuit 250, and a soft start circuit 260.

The logic circuit 210 generates the m-bit digital reference signal Dref in accordance with the target value of the output voltage Vout. Describing more specifically, the logic circuit 210 sets the digital reference signal Dref at a larger value as the target value of the output voltage Vout becomes higher; in contrast, the logic circuit 210 sets the digital reference signal Dref at a smaller value as the target value of the output voltage Vout becomes lower. In the meantime, the target value of the output voltage Vout can be set arbitrarily by rewriting a register value of the logic circuit 210 from outside the power source apparatus 10 and the like.

However, unlike the above first embodiment, the logic circuit 210 does not perform the increment control (sweep control) of the digital reference signal Dref. Accordingly, as long as the target value of the output voltage Vout is not changed, the data value of the digital reference signal Dref remains fixed.

On the other hand, instead of the increment control of the digital reference signal Dref, the logic circuit 210 generates an n-bit digital sweep signal Dswp. Describing specifically, the logic circuit 210 increases the digital sweep signal Dswp from the minimum value (=00h (0d)) to the maximum value (e.g., FFh (255d)) in increments of one in such a manner that the output voltage Vout rises slowly when the power source apparatus 10 is started up.

The reference voltage generation circuit 220 includes a digital/analog converter 221 and a voltage amplification portion 222, and generates the reference voltage Vref in accordance with the digital reference signal Dref.

The digital/analog converter 221 converts the m-bit digital reference signal Dref into a $2^m$-gradation analog reference voltage Aref. The larger the data value of the digital reference signal Dref is, the higher the analog reference voltage Aref becomes, while the smaller the data value of the digital reference signal Dref is, the lower the analog reference voltage Aref becomes. In the meantime, as the digital/analog conversion type, conventional types (R/2R type, string type and the like) having achievements until now may be employed.

The voltage amplification portion 222 includes an operational amplifier 222a, resistors 222b and 222c (resistance values: Rb and Rc), and generates the reference voltage Vref (=α×Aref) by amplifying the analog reference voltage Aref by using a predetermined gain α(=(Rb+Rc)/Rc). Accordingly, the higher the analog reference signal Aref is, the higher the reference voltage Vref becomes; in contrast, the lower the analog reference signal Aref is, the lower the reference voltage Vref becomes.

The error amplifier 230 generates the error voltage Verr in accordance with a difference between the lower one of the reference voltage Vref and the soft start voltage Vss respectively input into two non-inverting input terminals (+) and the feedback voltage Vfb input into an inverting input terminal (−). The error voltage Verr rises when the feedback voltage Vfb is lower than the reference voltage Vref (or the soft start voltage Vss), and drops when the feedback voltage Vfb is higher than the reference voltage Vref (or the soft start voltage Vss).

The DC/DC converter 240 includes a switching control portion 241, an output transistor 242 (N-channel type MOS [metal-oxide-semiconductor] field effect transistor), a synchronization rectification transistor 243 (P-channel type MOS field effect transistor), a coil 244, an output capacitor 245, and a load switch 246, and generates the output voltage Vout by stepping up the input voltage Vin in accordance with the error voltage Verr.

The switching control portion 241 performs complementary on/off control of the output transistor 242 and synchronization rectification transistor 243 in such a manner that the error voltage Verr becomes small. In the meantime, the above "complementary on/off control" includes: a case where the on/off states of the output transistor 242 and synchronization rectification transistor 243 are completely reversed; and a case where a concurrent off-period of the output transistor 242 and synchronization rectification transistor 243 is disposed from the viewpoint of preventing a through-current.

A first terminal of the coil 244 is connected to an application terminal of the input voltage Vin. A second terminal of the coil 244 is connected to a drain of the output transistor 242 and a drain of the synchronization rectification transistor 243. A source of the output transistor 242 is connected to a ground terminal. A gate of the output transistor 242 and a gate of the synchronization rectification transistor 243 are all connected to the switching control portion 241. A source of the synchronization rectification transistor 243 is connected to an application terminal of the output voltage Vout via the load switch 246. The output capacitor 245 is connected between the application terminal of the output voltage Vout and the ground terminal.

The load switch 246 is turned on when an enable signal EN is at a high level, and turned off when the enable signal EN is at a low level.

A basic operation (step-up operation) of the DC/DC converter having the above structure is briefly described. When the output transistor 242 is turned on and the synchronization rectification transistor 243 is turned off, a switch current flows in the coil 244 toward the ground via the output transistor 242, and its electric energy is stored. On the other hand, when the output transistor 242 is turned off and the synchronization rectification transistor 243 is turned on, the electric energy stored in the coil 244 is discharged as an electric current to charge the output capacitor 245. In this way, the complementary on/off of the output transistor 242 and synchronization rectification transistor 243 is repeated, so that the output voltage Vout obtained by stepping up the input voltage Vin is generated.

In the meantime, the output type of the DC/DC converter 240 is not limited to the stepping-up type, but may be a step-down type or a step-up/down type. Besides, instead of the synchronization rectification transistor 243, a rectification diode may be used.

The feedback voltage generation circuit 250 includes resistors 251 and 252 connected in series between the application terminal of the output voltage Vout and the ground terminal, and outputs the feedback voltage Vfb obtained by dividing the output voltage Vout from a connection node between the resistor 251 and the resistor 252.

The soft start circuit 260 includes a digital/analog converter 261 and a voltage amplification portion 262, and generates the soft start voltage Vss in accordance with the digital sweep signal Dswp.

The digital/analog converter 261 converts the n-bit digital sweep signal Dswp into a $2^n$-gradation analog sweep voltage Aswp ($=Vref \times Dswp/(2^n-1)$). The larger the data value of the digital sweep signal Dswp is, the higher the analog sweep voltage Aswp becomes; in contrast, the smaller the data value of the digital sweep signal Dswp is, the lower the analog sweep voltage Aswp becomes. In the meantime, as described above, the logic circuit 210 increases the digital sweep signal Dswp from the minimum value (=00h (0d)) to the maximum value (e.g., FFh (255d)) in increments of one in such a manner that the output voltage Vout rises slowly when the power source apparatus 10 is started up.

For example, a case is considered where the digital sweep signal Dswp (=00h to FFh (0d to 255d)) composed of 8-bits (256 gradations) is converted into the analog sweep voltage Aswp. In this case, when Dswp=00h (0d), Aswp=0 V; when Dswp=7 Fh (127d), Aswp=Vref/2; and when Dswp=FFh (255d), Aswp=Vref. In the meantime, as the digital/analog conversion type, conventional types (R/2R type, string type and the like) having achievements until now may be employed.

Besides, the digital/analog converter 261 is supplied with the reference voltage Vref as its power source voltage. Accordingly, if the data value of the digital sweep signal Dswp is the same, the higher the reference voltage Vref is, the higher the analog sweep voltage Aswp becomes; in contrast, the lower the reference voltage Vref is, the lower the analog sweep voltage Aswp becomes.

The voltage amplification portion 262 includes an operational amplifier 262a, resistors 262b and 262c (resistance values: rb and rc), and generates the soft start voltage Vss ($=\beta \times Aswp$) by amplifying the analog sweep voltage Aswp by using a predetermined gain $\beta(=(rb+rc)/rc)$. Accordingly, the higher the analog sweep voltage Aswp is, the higher the soft start voltage Vss becomes; in contrast, the lower the analog sweep voltage Aswp is, the lower the soft start voltage Vss becomes. In the meantime, because $\beta>1$, the highest value VssH of the soft start voltage Vss becomes higher than the reference voltage Vref, and becomes a variable value ($=\beta \times Vref$) that changes in accordance with the reference voltage Vref.

Figure 4A:
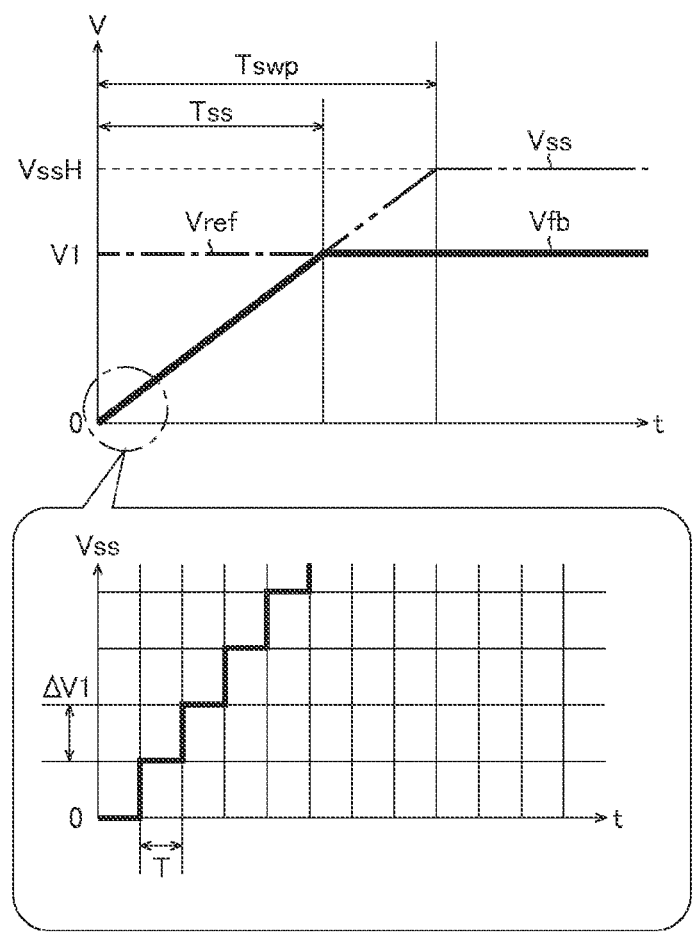
FIG. 4A is a view showing a correlation among Vref, Vss, and Vfb (Vref=V1).
Figure 4B:
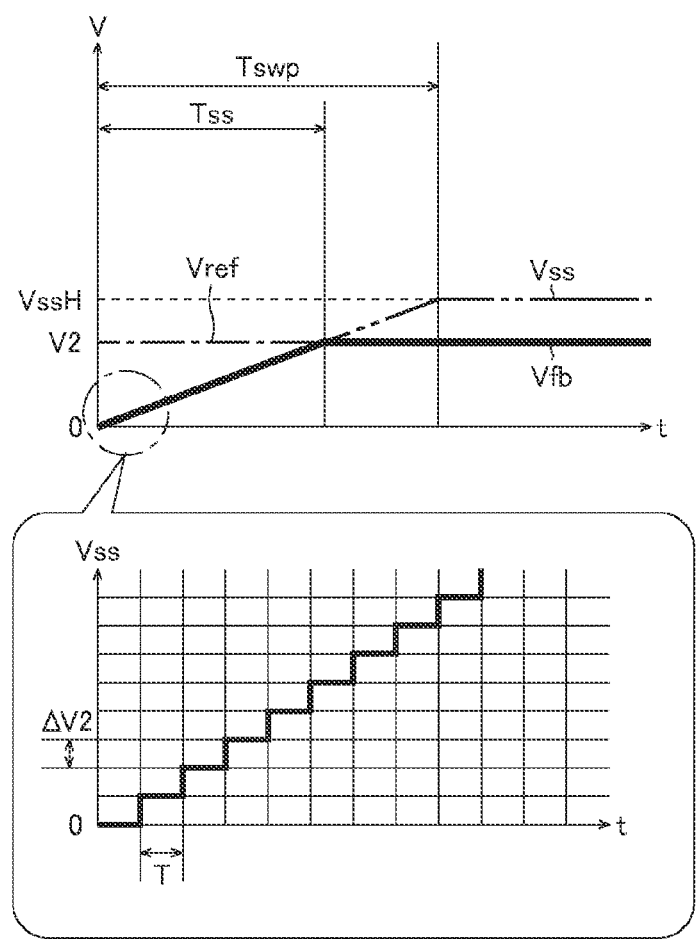
FIG. 4B is a view showing a correlation among Vref, Vss, and Vfb (Vref=V2).

FIG. 4A and FIG. 4B are each a view that shows a correlation among the reference voltage Vref (one-dot-one-bar line), the soft star voltage Vss (two-dot-one-bar line), and the feedback voltage Vfb (solid line). In the power source apparatus 10 according to the second embodiment, output feedback control is performed in such a manner that the feedback voltage Vfb and the lower one of the reference voltage Vref and soft start voltage Vss become equal to each other. Accordingly, during a period when the soft start voltage Vss is lower than the reference voltage Vref, the feedback voltage Vfb slowly rises following the soft start voltage Vss, and when the soft start voltage Vss becomes higher than the reference voltage Vref, the feedback voltage Vfb becomes equal to the reference voltage Vref.

In the meantime, a time, which is taken by the soft start voltage Vss to start rising and reach the reference voltage Vref, corresponds to the soft start time Tss.

Here, as shown in FIG. 4A, in a case where the reference voltage Vref is set at V1, the soft start voltage Vss rises in a stepwise manner by an increment voltage of $\Delta V1$ at every increment period T, and finally takes a predetermined sweep time Tswp to reach VssH ($=\beta \times V1$).

On the other hand, as shown in FIG. 4B, in a case where the reference voltage Vref is set at V2 (=half V1), the soft start voltage Vss rises in a stepwise manner by an increment voltage of $\Delta V2$ (=half $\Delta V1$) at every increment period T, and finally takes the sweep time Tswp to reach VssH ($=\beta \times V2$). In other words, the reference voltage Vref is pulled down from V1 to V2, in accordance with which the highest value VssH and increment voltage $\Delta V$ of the soft start voltage Vss are pulled down, and a rising speed of the soft start voltage Vss is dropped.

Because of such variable control of the highest value VssH and increment voltage $\Delta V$ of the soft start voltage Vss, the soft start voltage Vss takes the predetermined sweep time Tswp to slowly rise from the lowest value VssL (=0 V) to the highest value VssH ($=\beta \times Vref$). Accordingly, it becomes possible to keep the soft start time Tss constant irrespective of the reference voltage Vref.

Besides, in the soft start circuit 260 according to the present structural example, it is not necessary to perform the variable control of the increment period T in accordance with the reference voltage Vref; accordingly, it is not necessary to use the division portion 111 (the number of gates:

about 2000, the area: about 600 μm×600 μm) that has a relatively large circuit scale. In the meantime, in the power source apparatus 10 according to the second embodiment, it is necessary to newly add the soft start circuit 260, but its circuit area is about 230 μm×230 μm which is very small compared with the division portion 111. Accordingly, in the power source apparatus 10 according to the second embodiment, compared with the above first embodiment, it becomes possible to achieve a dramatic chip shrink (e.g., about ⅐).

Figure 5:
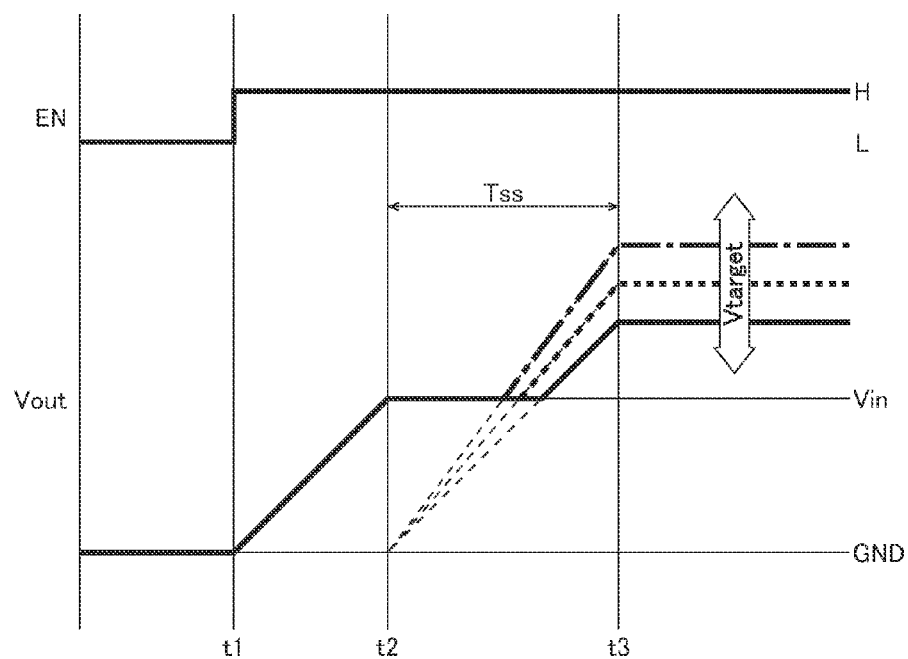
FIG. 5 is a view showing an example of a soft start operation.

FIG. 5 is a view showing an example of the soft start operation and illustrates behavior (measured results of a prototype) of the enable signal EN and output voltage Vout from top in order.

When the enable signal EN is raised to the high level (which corresponds to a logic level during an enable time of the power source apparatus 10) at a time point t1, the load switch 246 is turned on. As a result of this, the application terminal of the input voltage Vin and the application terminal of the output voltage Vout are electrically connected to each other; accordingly, the output voltage Vout starts to rise.

However, at the time point t1, the logic circuit 210 generates the digital reference signal Dref to raise the reference voltage Vref, while keeping the soft start voltage Vss at the lowest value VssL (=0 V) without starting the increment of the digital sweep signal Dswp. Therefore, in the DC/DC converter 240, the output feedback control is performed in such a manner that Vfb=VssL (=0 V); accordingly, the step-up operation of the input voltage Vin goes to a standby state.

Thereafter, at a time point t2, the output voltage Vout rises nearly to the input voltage Vin, and at a time point when the step-up operation of the DC/DC converter 240 becomes possible, the logic circuit 210 starts the increment of the digital sweep signal Dswp to raise the soft start voltage Vss. As a result of this, after the soft start voltage Vss exceeds the feedback voltage Vfb, the output voltage Vout rises following the soft start voltage Vss.

Here, the higher the target value Vtarget of the output voltage Vout is, the faster the rising speed of the soft start voltage Vss becomes, while the lower the target value Vtarget of the output voltage Vout is, the slower the rising speed of the soft start voltage Vss becomes. Accordingly, it becomes possible to always keep the soft start time Tss at a constant value (e.g., about 10 ms) irrespective of the target value Vtarget of the output voltage Vout.

When the soft start time Tss elapses (the soft start voltage Vss becomes higher than the reference voltage Vref) at a time point t3, in the DC/DC converter 240, the output feedback control is performed in such a manner that Vfb=Vref. Accordingly, after the time point t3, the output voltage Vout is kept at the target value Vtarget.

Figure 6:
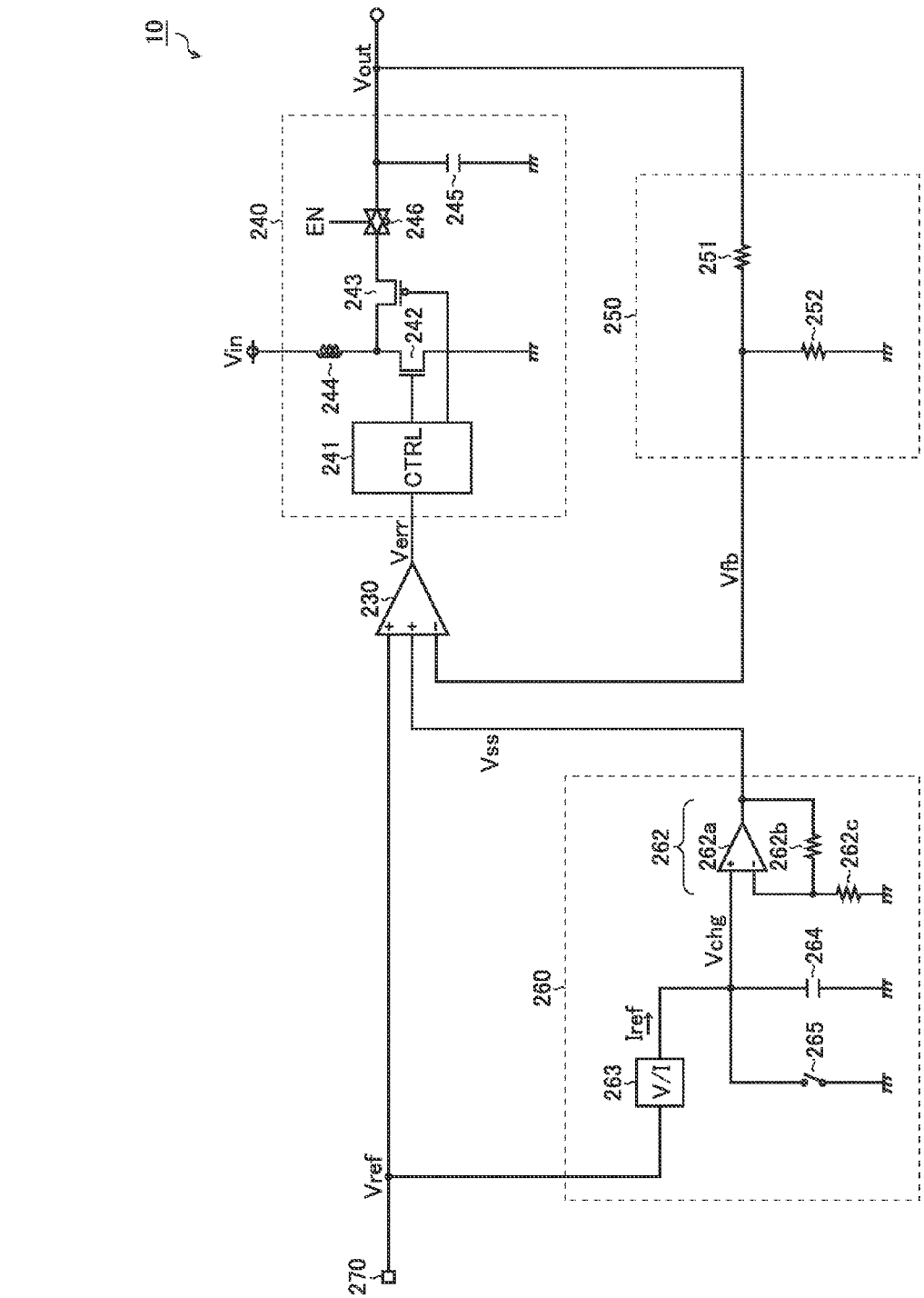
FIG. 6 is a view showing a third embodiment of the power source apparatus 10.

FIG. 6 is a view showing a third embodiment of the power source apparatus 10. The power source apparatus 10 according to the present embodiment is basically the same as the second embodiment (FIG. 3), and has features that (1) an external terminal 270 is disposed instead of the reference voltage generation circuit 220; (2) the soft start circuit 260 is changed from the digital type to an analog type; and (3) the logic circuit 210 is removed in accordance with the above change. Because of this, the same components as the second embodiment are indicated by the same reference numbers to skip the double description, and hereinafter, the feature portions of the third embodiment are mainly described.

The external terminal 270 is disposed to accept an external input of the reference voltage Vref. By employing such a structure, it is possible to arbitrarily adjust the reference voltage Vref outside the power source apparatus 10.

The soft start circuit 260 includes a voltage/current conversion portion 263, a capacitor 264, and a charge/discharge switch 265 instead of the digital/analog converter 261.

The voltage/current conversion portion 263 converts the reference voltage Vref into a reference current Iref. The higher the reference voltage Vref is, the larger the reference current Iref becomes, while the lower the reference voltage Vref is, the smaller the reference current Iref becomes. A structure and operation of the voltage/current conversion portion 263 are detailed later.

The capacitor 264 is connected between an output terminal of the voltage/current conversion portion 263 and a ground terminal, and is charged by the reference current Iref. The voltage amplification portion 262 amplifies a charge voltage Vchg of the capacitor 264 by using a predetermined gain β and thereby generates the soft start voltage Vss (=β×Vchg).

The charge/discharge switch 265 is connected in parallel with the capacitor 264, and turned off at a starting timing of the soft start. During a turned-off period of the charge/discharge switch 265, the capacitor 264 is charged by the reference current Iref; accordingly, the charge voltage Vchg rises. On the other hand, during a turned-on period of the charge/discharge switch 265, both end terminals of the capacitor 264 are short-circuited to each other via the charge/discharge switch 265; accordingly, the charge voltage Vchg is reset to 0 V.

In the soft start circuit 260 according to the present structural example, the higher the reference voltage Vref is, the larger the reference current Iref becomes; accordingly, the charge speed of the capacitor 264 becomes fast, and the charge voltage Vchg rises more sharply. On the other hand, the lower the reference voltage Vref is, the smaller the reference current Iref becomes; accordingly, the charge speed of the capacitor 264 becomes slow, and the charge voltage Vchg rises more slowly.

As described above, in the soft start circuit 260 according to the present structural example, in accordance with the reference voltage Vref, the rising speed of the charge voltage Vchg changes, namely, the rising speed of the soft start voltage Vss changes. Describing more specifically, the higher the reference voltage Vref is, the faster the rising speed of the soft start voltage Vss becomes, while the lower the reference voltage Vref is, the slower the rising speed of the soft start voltage Vss becomes. This is the same behavior as shown in FIG. 4A and FIG. 4B described above. Accordingly, it becomes possible to always keep the soft start time Tss constant irrespective of the reference voltage Vref.

In the meantime, it is also possible to use the above change points (1) and (2) independent of each other. In other words, with the circuit structure of the second embodiment (FIG. 3) used as a basis, only the change point (1) may be used, or only the change point (2) may be used. However, in the case where only one of the change points (1) and (2) is used, the logic circuit 210 becomes necessary; accordingly, it becomes impossible to use the change point (3).

Figure 7:
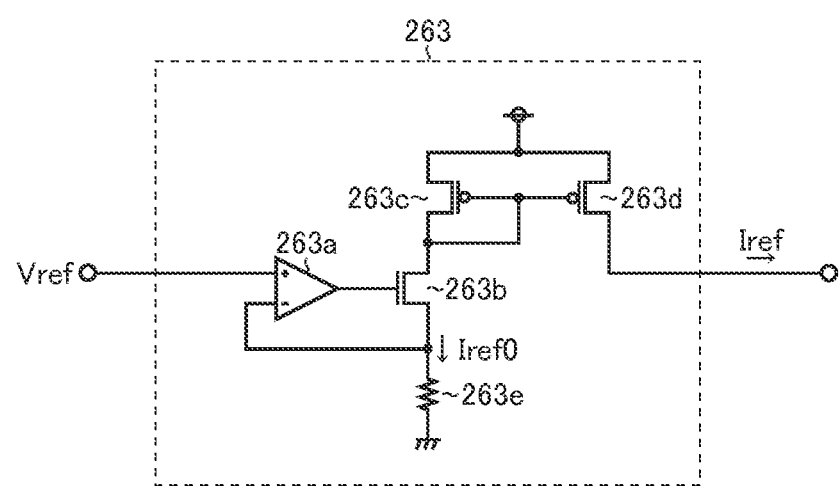
FIG. 7 is a view showing a structural example of a voltage/current conversion portion 263.

FIG. 7 is a view showing a structural example of the voltage/current conversion portion 263. The voltage/current conversion portion 263 includes an operational amplifier 263a, an N-channel type MOS field effect transistor 263b, P-channel type MOS field effect transistors 263c and 263d, and a resistor 263e (resistance value: R).

A non-inverting input terminal (+) of the operational amplifier 263a is connected to the application terminal of the reference voltage Vref. An inverting input terminal (−) of the operational amplifier 263a is connected to a source of the transistor 263b. An output terminal of the operational amplifier 263a is connected to a gate of the transistor 263b. A source of the transistor 263b is connected to a ground terminal via the resistor 263e. A drain of the transistor 263b is connected to a drain of the transistor 263c. Sources of the transistors 263c and 263d are all connected to a power source terminal Gates of the transistors 263c and 263d are all connected to the drain of the transistor 263c. A drain of the transistor 263d as an output terminal of the reference current Iref is connected to the capacitor 264 (not shown in this figure).

The operational amplifier 263a performs gate control of the transistor 263b in such a manner that the non-inverting input terminal (+) and the inverting input terminal (−) are short-circuited to each other in an imaginary manner. Accordingly, an electric current Iref0 (=Vref/R) in accordance with the reference voltage Vref flows in the resistor 263e. The transistors 263c and 263d form a current mirror, and mirrors the electric current Iref0 flowing to the drain of the transistor 263c by using a mirror ratio M, whereby the reference current Iref (=M×Iref0) is output from the drain of the transistor 263d.

The reference current Iref generated in this way has an electric-current value (=M×Vref/R) in accordance with the reference voltage Vref. In other words, the higher the reference voltage Vref is, the larger the reference current Iref becomes, while the lower the reference voltage Vref is, the smaller the reference current Iref becomes.

<Application to Television>

Figure 8:
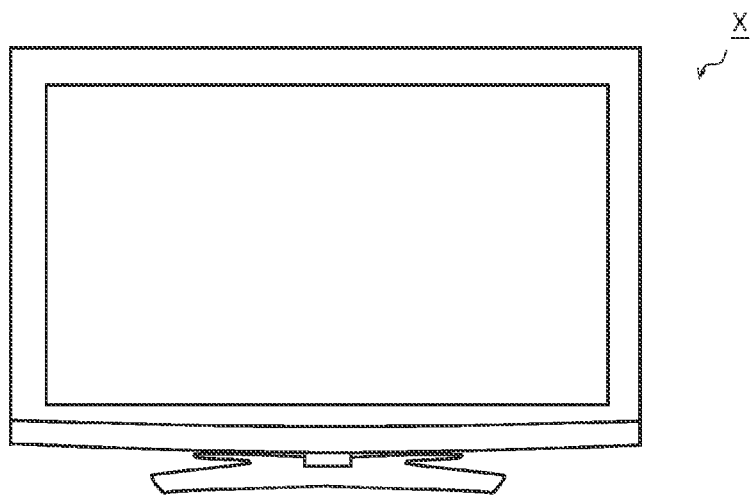
FIG. 8 is an appearance view of a television X.

FIG. 8 is an appearance view of a television X. The television X is a specific example of the electronic apparatus 1, and incorporates the above power source apparatus 10 as its power source portion. Accordingly, in the television X according to the present structural example, it is possible to start up a system by using the constant soft start time Tss; accordingly, it becomes possible to stabilize a rising behavior (startup sequence).

<Other Modifications>

In the meantime, the various technical features disclosed in the present specification are able to be modified without departing from the spirit of the technical creation besides the above embodiments. In other words, it should be considered that the above embodiments are examples in all respects and are not limiting, and it should be understood that the technical scope of the present invention is not indicated by the above description of the embodiments but by the claims, and all modifications within the scope of the claims and the meaning equivalent to the claims are covered.

INDUSTRIAL APPLICABILITY

The invention disclosed in the present specification is applicable to general power source apparatuses that include a soft start function.

What is claimed is:

1. A soft start circuit used in a power source apparatus, wherein
the soft start circuit accepts an input of a reference voltage set arbitrarily, and generates a soft start voltage that takes a predetermined sweep time to slowly rise from a predetermined lowest value to a highest value that is higher than the reference voltage and changes in accordance with the reference voltage, and
the soft start circuit comprises:
a digital/analog converter that is supplied with the reference voltage as a power source voltage, and converts a digital sweep signal, which is increased at a constant period from a minimum value to a maximum value, into an analog sweep voltage, and
a voltage amplification portion that amplifies the analog sweep voltage by using a predetermined gain and thereby generates the soft start voltage.

2. A power source apparatus comprising:
the soft start circuit according to claim 1,
an error amplifier that generates an error voltage in accordance with a difference between a feedback voltage and a lower one of the reference voltage and the soft start voltage,
a DC/DC converter that generates an output voltage from an input voltage in accordance with the error voltage, and
a feedback voltage generation portion that generates the feedback voltage in accordance with the output voltage.

3. The power source apparatus according to claim 2, further comprising
a reference voltage generation circuit that generates the reference voltage.

4. The power source apparatus according to claim 3, wherein
the reference voltage generation circuit includes:
a second digital/analog converter that converts a digital reference signal set arbitrarily into an analog reference voltage, and
a second voltage amplification portion that amplifies the analog reference voltage by using a predetermined gain and thereby generates the reference voltage.

5. The power source apparatus according to claim 4, further comprising
a logic circuit that generates at least one of the digital sweep signal and the digital reference signal.

6. The power source apparatus according to claim 5, wherein
the logic circuit generates the digital reference signal to raise the reference voltage at a time when the power source apparatus is enabled, thereafter, generates the digital sweep signal to raise the soft start voltage at a time when the DC/DC converter becomes operable.

7. The power source apparatus according to claim 2, further comprising
an external terminal for accepting an external input of the reference voltage.

8. An electronic apparatus comprising:
the power source apparatus according to claim 2, and
a load that is supplied with an output voltage from the power source apparatus to operate.

* * * * *